Jan. 9, 1968 — I. R. RITSEMA — 3,362,193

UNIVERSAL JOINT

Filed June 2, 1966 — 2 Sheets-Sheet 1

INVENTOR.
IRVING R. RITSEMA
BY William N. Antonis
ATTORNEY

Jan. 9, 1968  I. R. RITSEMA  3,362,193
UNIVERSAL JOINT
Filed June 2, 1966  2 Sheets-Sheet 2
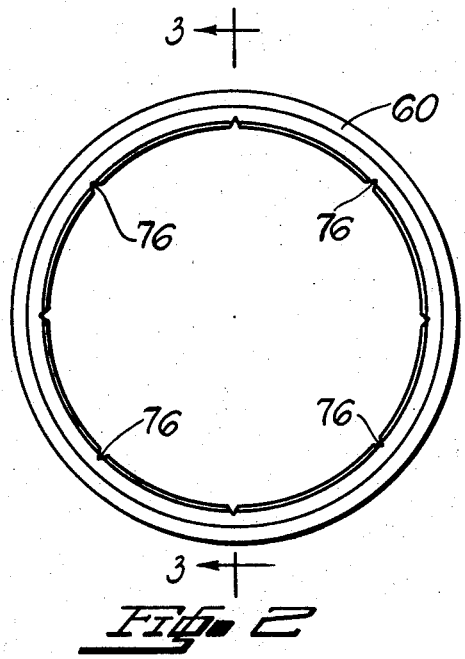
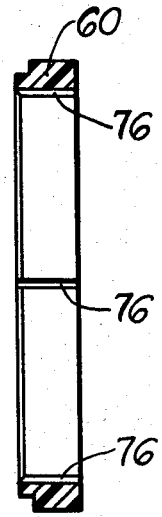
INVENTOR.
IRVING R. RITSEMA
BY
William N. Antonis
ATTORNEY

3,362,193
UNIVERSAL JOINT
Irving R. Ritsema, South Bend, Ind., assignor to The Bendix Corporation, a corporation of Delaware
Filed June 2, 1966, Ser. No. 554,745
5 Claims. (Cl. 64—32)

This invention relates to universal joints and, more particularly, to a nonrotatable lubricant retaining housing for universal joints.

The problem of sealing universal joints so as to retain the lubricant therein and to exclude dirt therefrom has always been difficult, and while numerous efforts have been made in this respect, the problem has continued to be a serious one. One aspect of this problem is that most of the flexible housings or boots, which have been utilized in connection with high speed universal joints, have been rotatable and subject to distention and rupture under the influence of centrifugal force, especially when lubricant from within the joint body escaped into the boot.

Accordingly, it is an object of this invention to provide a lubricant retaining housing for a universal joint which is not rotatable and which will not be detrimentally affected by centrifugal forces.

Another object of this invention is to provide a lubricant retaining housing which has a longer life than conventional lubricant retaining housings.

More specifically, it is a object of this invention to provide, in a universal joint having an outer unitary assembly and an inner unitary assembly, a lubricant retaining housing comprising an annular nonrotatable sealing member located in an annular groove formed on said outer unitary assembly, and a nonrotatable flexible enclosure for permitting angular motion between said inner and outer assemblies, said flexible enclosure having one end thereof operatively connected to a stationary housing, and the other end thereof operatively connected to the sealing member.

An important object of this invention is to provide a plurality of axially extending circumferentially spaced grooves on the inner periphery of the sealing member for retaining lubricant and solid contaminants therein.

The above and other objects, features and advantages of the invention will become apparent from the following description taken in connection with the accompanying drawing which forms a part of this disclosure and in which:

FIGURE 2 is a plan view of the sealing ring which is part of the lubricant retaining housing; and FIGURE 3 is a sectional view taken along lines 3—3 of FIGURE 2.

Figure 1:
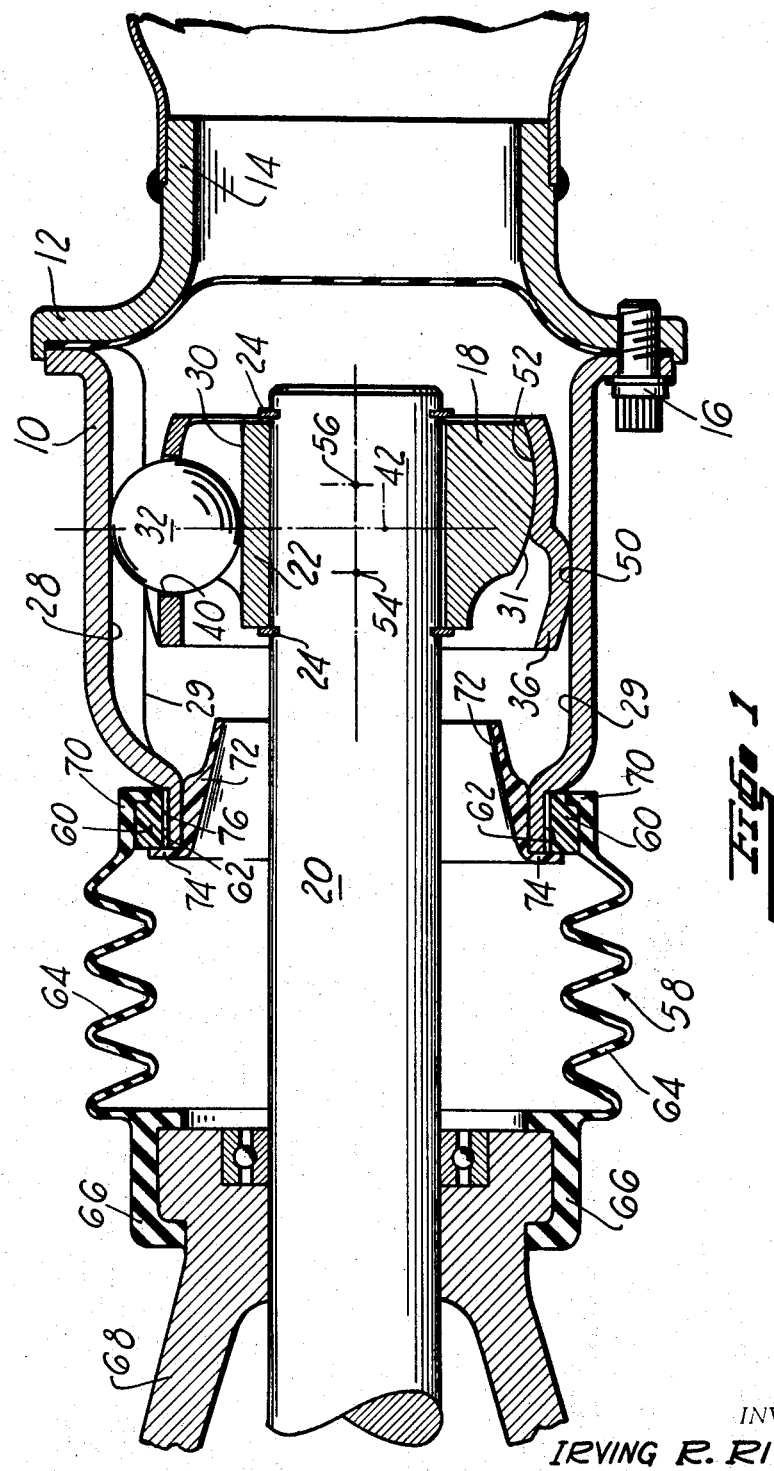
FIGURE 1 is a sectional view of a universal joint incorporating the invention.

Referring to FIGURE 1 of the drawing, it will be seen that numeral 10 designates an outer hollow cylindrical member which is adapted to be secured to the flange 12 of shaft 14 through suitable means such as bolts 16, only one of which is shown. An inner ring member 18 is located within the outer hollow cylindrical member 10 and is suitably attached to shaft 20 through means such as splines 22 and snap rings 24. If desired, the ring member 18 may be formed on the end of shaft 20.

Formed on the inner cylindrical surface of the outer member 10 are six parallel straight race grooves 28 (only one of which is shown) which are arranged to form cylindrical spaces with six corresponding parallel straight race grooves 30 (only one of which is shown) formed on the outer cylindrical surface of inner ring member 18. The outer race grooves 28 are separated by lands 29, whereas the inner race grooves 30 are separated by lands 31.

Six power transmitting balls 32, one of which movably engages each corresponding set of straight race grooves 28 and 30, are utilized for transmitting torque from the outer member 10 to the inner member 18, or vice versa. In order for the device to transmit torque at constant angular velocity, it is necessary to maintain the power transmitting balls 32 in a common plane which bisects the obtuse angle formed by the shafts 14 and 20. This plane which bisects the obtuse shaft angle is known as the homokinetic plane. In order to maintain the balls 32 in this homokinetic plane at any joint angle, a control mechanism which consists solely of a cage 36 is located intermediate the outer and inner members 10 and 18. The cage includes six slot-type apertures 40 (only one of which is shown) each of which contains one of the balls for maintaining the balls in a common plane 42. The ball retaining cage 36 has an outer spherical surface 50 formed thereon for pivotally engaging the lands 29 with the outer member 10 and an inner spherical surface 52 formed therein for pivotally engaging the lands 31 on the inner member 18. By virtue of this pivotal arrangement, any angular movement between the shafts 14 and 20 results in the proper radial positioning of the cage for maintaining the balls in the homokinetic plane. Thus, the described universal joint comprises two relatively movable unitary assemblies, one of which includes the outer hollow cylindrical member 10 and shaft 14, and the other of which includes the inner ring member 18, shaft 20, balls 32 and cage 36. For additional details regarding this type of universal joint, reference may be made to Charles R. Grauel's copending patent application Ser. No. 460,039, filed June 1, 1965.

Operation of the universal joint will be as follows: When the shafts 14 and 20 are moved angularly with respect to each other, such angular movement will cause the cage 36 to pivot about pivot points 54 and 56 by virtue of the contact occurring between the spherical surfaces 50 and 52 and the respective contacting outer and inner lands 29 and 31. Such pivoting of the cage results in a given angular movement, which angular movement is one-half the relative angular movement of the shafts. Such angular movement will have the effect of placing the balls in the homokinetic plane previously described.

By utilizing corresponding parallel straight race grooves 28 and 30 on the outer and inner members 10 and 18, respectively, it is possible to create a constant velocity universal joint which will provide substantial axial movement of one of the shafts 14 or 20, with respect to the other, at all angular positions within the designed parameters. The fact that the shafts 14 and 20 are moving axially with respect to each other as well as angularly with respect to each other does not effect the homokinetic plane of the balls since the two unitary assemblies of the joint, which were previously described, are functionally in the same operative position for angular movements regardless of the relative axial positions therebetween.

In order to protect the universal joint from ingress of dirt and the escape of lubricant, it will be noted from the drawing that a novel lubricant retaining housing 58 is utilized. This housing includes an annular nonrotatable sealing member 60 located in an annular groove 62 formed on the outer periphery of the outer hollow cylindrical member 10, and a nonrotatable convoluted flexible enclosure 64 for permitting angular and axial motion between the shafts 14 and 20. The flexible enclosure 64 has one end 66 thereof suitably connected to a stationary housing 68, such as for example the transmission housing, and the other end 70 thereof operatively connected to the annular sealing member 60.

A frustoconical lubricant baffle 72 having a radially extending flange 74 for retaining the annular sealing member 70 in the annular groove 62 is press fit into the end of the outer hollow cylindrical member 10. As shown in FIGURES 2 and 3, it will be seen that the annular sealing member includes a plurality of axially extending circumferentially spaced grooves 76 on the inner periphery thereof for retaining lubricant and solid contaminants therein. Thus, the purpose of these circumferentially spaced grooves is two-fold. First of all, the grease retained in these grooves is a source of lubrication. Secondly, these grooves also provide an area for foreign material and loose particles of the seal to lodge thereby keeping the two rubbing surfaces clean.

From the foregoing, it will be understood that this novel lubricant retaining housing does not rotate. Only the outer hollow member 10 rotates within the stationary annular seal 60, said annular seal being prevented from rotating by the flexible rubber boot 64 which exerts an axial force that is absorbed by the seal ends rubbing against the associated rotating members.

The several practical advantages which flow from this novel lubricant retaining housing are believed to be obvious from the foregoing description and other advantages may suggest themselves to those who are familiar with the art to which this invention relates.

Furthermore, although this invention has been described in connection with a specific embodiment, it will be obvious to those skilled in the art that various changes may be made in the form, structure and arrangement of parts without departing from the spirit of the invention. For example, this invention could be utilized in connection with other types of universal joints.

Having thus described the various features of the invention what I claim as new and desire to secure by Letters Patent is:

1. In a universal joint having first and second shafts, said first shaft being rotatable within and in sealing engagement with a stationary housing, an inner member fixedly connected to said first shaft, an outer hollow member fixedly connected to said second shaft, said outer member having an annular groove on the periphery thereof, means for transmitting torque from one of said members to the other of said members, and a lubricant therein for lubricating the working parts of said universal joint, a lubricant retaining housing comprising an annular nonrotatable sealing member located in said annular groove, and a nonrotatable convoluted flexible enclosure for permitting angular motion between said first and second shafts, said flexible enclosure having one end thereof operatively connected to said stationary housing and the other end thereof operatively connected to said annular sealing member.

2. A lubricant retaining housing, as defined in claim 1, wherein said annular sealing member includes groove means on the inner periphery thereof for retaining lubricant and solid contaminants therein.

3. A lubricant retaining housing, as defined in claim 2, wherein said groove means comprises a plurality of axially extending circumferentially spaced grooves.

4. A lubricant retaining housing, as defined in claim 3, wherein said annular groove is located at the end of said outer member which is closest to said stationary housing.

5. A lubricant retaining housing, as defined in claim 4, which includes a frustoconical lubricant baffle located within and connected to said outer member, said baffle having a radially extending flange for forming one side of and retaining said annular sealing member in said annular groove.

References Cited

UNITED STATES PATENTS

| | | | |
|---|---|---|---|
| 1,922,431 | 8/1933 | Geyer | 64—32 |
| 2,702,996 | 3/1955 | Davis | 64—32 |
| 2,761,295 | 9/1956 | Davis | 64—1 |
| 2,781,649 | 2/1957 | Stahl et al. | 64—32 X |
| 2,857,975 | 10/1958 | Thorne | 64—8 X |
| 3,204,427 | 9/1965 | Dunn | 64—8 |
| 3,255,839 | 6/1966 | Goldman | 64—32 X |

HALL C. COE, *Primary Examiner.*